US012650605B2

(12) United States Patent
Bisesto et al.

(10) Patent No.: US 12,650,605 B2
(45) Date of Patent: Jun. 9, 2026

(54) COHERENT BEAM COMBINATION SYSTEM AND CONTROL METHOD THEREOF

(71) Applicant: Leonardo S.P.A., Rome (IT)

(72) Inventors: Fabrizio Giuseppe Bisesto, Pomezia (IT); Alessandro Perna, Pomezia (IT); Francesco Coppola, Pomezia (IT); Alberto Cosentino, Pomezia (IT)

(73) Assignee: Leonardo S.P.A., Rome (IT)

( * ) Notice: Subject to any disclaimer, the term of this patent is extended or adjusted under 35 U.S.C. 154(b) by 0 days.

(21) Appl. No.: 18/571,497

(22) PCT Filed: Apr. 5, 2023

(86) PCT No.: PCT/IB2023/053454
§ 371 (c)(1),
(2) Date: Dec. 18, 2023

(87) PCT Pub. No.: WO2023/194921
PCT Pub. Date: Oct. 12, 2023

(65) Prior Publication Data
US 2025/0020939 A1     Jan. 16, 2025

(30) Foreign Application Priority Data

Apr. 5, 2022    (EP) ..................................... 22425015
Jun. 22, 2022    (IT) ........................ 102022000013186

(51) Int. Cl.
*G02B 27/10*      (2006.01)
*H01S 3/00*       (2006.01)
*H01S 3/067*      (2006.01)

(52) U.S. Cl.
CPC .......... *G02B 27/106* (2013.01); *H01S 3/0057* (2013.01); *H01S 3/0085* (2013.01); *H01S 3/0675* (2013.01)

(58) Field of Classification Search
CPC ... G02B 27/106; H01S 3/0057; H01S 3/0085; H01S 3/0675
(Continued)

(56) References Cited

U.S. PATENT DOCUMENTS 9,735,537 B1 *  8/2017  Rothenberg ....... G02B 27/0927
2009/0134310 A1  5/2009  Goodno
(Continued)

OTHER PUBLICATIONS

International Search Report and Written Opinion for International Application No. PCT/IB2023/053454 mailed Aug. 3, 2023.
(Continued)

*Primary Examiner* — William Choi
(74) *Attorney, Agent, or Firm* — Ballard Spahr LLP

(57)          ABSTRACT

The coherent beam recombination system provides an output recombined beam and comprises: a laser source providing a source beam with linewidth; a beam broadener providing a broadened beam from the source beam; a splitter splitting the broadened beam into a plurality of secondary beams; a plurality of channels coupled to the splitter. Each channel receives a respective secondary beam and provides a respective intermediate beam. Each channel has an optical amplifier, a phase modulator, an optical delay line, and an opto-mechanical element. The CBC system further comprises an optical sensor that provides a detection signal indicative of an intensity of a received optical beam; a focusing optics that receives the intermediate beams, provides the output recombined beam from a first portion of each intermediate beam, and provides a sampled recombined beam to the optical sensor from a second portion of each intermediate beam. The CBC system further comprises a control unit coupled to the optical sensor and the plurality of channels. The control unit comprises a phase-locking module configured to: provide a plurality of phase control signals to the phase modulators; receive the detection signal
(Continued)

from the optical sensor, indicative of an intensity of the sampled recombined beam; calculate a cost function from the detection signal, wherein the cost function is a function of the intensity of the sampled recombined beam; perform an optimization algorithm of the cost function, configured to maximise the intensity of the sample recombined beam; and provide a plurality of updated phase control signals, based on a result of the optimization algorithm.

16 Claims, 8 Drawing Sheets

(58) Field of Classification Search
USPC .......................................................... 359/618
See application file for complete search history.

(56) References Cited

U.S. PATENT DOCUMENTS

2013/0315271 A1   11/2013   Goodno
2022/0094128 A1    3/2022   Uyeno et al.

OTHER PUBLICATIONS

Cekin, et al., "High-Power Laser-Induced Optical Aberrations on Beam Director Mirrors", Optical Engineering, vol. 60, No. 6. DOI: 10.1117 /I.OE.60.6.065102, Jun. 10, 2021, pp. 065102-1-065102-18.

Ma, et al., "7.1 kW Coherent Beam Combining System Based on a Seven-Channel Fiber Amplifier Array", Optics & Laser Technology vol. 140. https:// doi.org/10.1016/j.optlastec.2021.107016, Feb. 28, 2021, pp. 1-5.

Vasilyev, et al., "Coherent Power Combining of Chirped-Seed Erbium-Doped Fiber Amplifiers", IEEE Photonics Technology Letters, vol. 25, No. 16, Aug. 15, 2013, pp. 1616-1618.

Wang, et al., "Coherent Beam Combining of High-Order-Mode Fiber Lasers with Active Phase Control", Journal of Optics. doi:10. 1088/2040-8978/13/1/015704, Dec. 7, 2010, pp. 1-6.

Yu, et al., "Coherent Combining of a 4 kW Eight-Element Fiber Amplifier Array", Optics Letters, vol. 36, No. 14, Jul. 15, 2011, pp. 2686-2688.

* cited by examiner

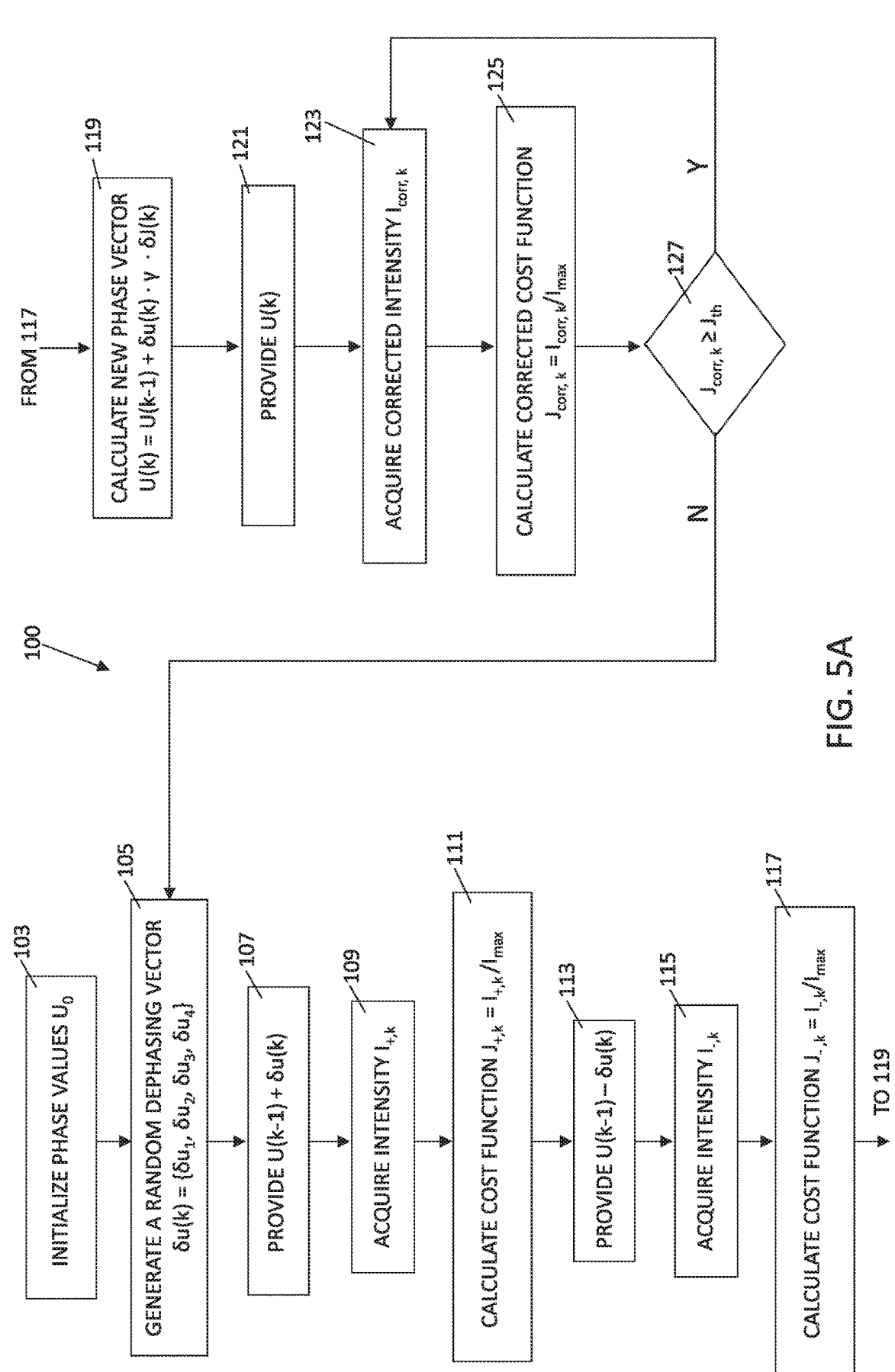

FROM 117

CALCULATE NEW PHASE VECTOR
$U(k) = U(k-1) + \delta u(k) - \gamma \cdot \delta J(k)$ — 119

PROVIDE $U(k)$ — 121

ACQUIRE CORRECTED INTENSITY $I_{corr,\ k}$ — 123

CALCULATE CORRECTED COST FUNCTION
$J_{corr,\ k} = I_{corr,\ k} / I_{max}$ — 125

$J_{corr,\ k} \geq J_{th}$ — 127

Y

N

100

INITIALIZE PHASE VALUES $U_0$ — 103

GENERATE A RANDOM DEPHASING VECTOR
$\delta u(k) = \{\delta u_1,\ \delta u_2,\ \delta u_3,\ \delta u_4\}$ — 105

PROVIDE $U(k-1) + \delta u(k)$ — 107

ACQUIRE INTENSITY $I_{+,k}$ — 109

CALCULATE COST FUNCTION $J_{+,k} = I_{+,k} / I_{max}$ — 111

PROVIDE $U(k-1) - \delta u(k)$ — 113

ACQUIRE INTENSITY $I_{-,k}$ — 115

CALCULATE COST FUNCTION $J_{-,k} = I_{-,k} / I_{max}$ — 117

RECEIVE C.U.T. DATA

RECEIVE LASER DATA

CALCULATE TEMPERATURE VARIATION

CALCULATE LOCAL VARIATIONS OF THE REFRACTIVE INDEX

CALCULATE INDUCED PHASE VARIATION

DECOMPOSE THE INDUCED PHASE VARIATION

SIMULATE THE BEAM PROPAGATION IN THE CBC SYSTEM

DETERMINE OPTIMAL C.U.T. DATA

C.U.T. DATA, LASER DATA

TEMPERATURE ANALYSIS MODULE

OPTIMAL C.U.T. DATA

COHERENT BEAM COMBINATION SYSTEM AND CONTROL METHOD THEREOF

CROSS-REFERENCE TO RELATED APPLICATIONS

This application is a U.S. National Stage Application of International Application No. PCT/IB2023/053454 filed on Apr. 5, 2023, which claims priority from European Patent Application No. 22425015.9 filed on Apr. 5, 2022 and from Italian Patent Application No. 102022000013186 filed on Jun. 22, 2022 the entire disclosures of which are incorporated herein by reference.

TECHNICAL FIELD OF THE INVENTION

The present invention relates to a coherent beam combination (CBC) system and to a control method thereof.

STATE OF THE ART

As is known, coherent beam combination is a technique that is used to obtain a high power laser beam from a low power laser source.

A known coherent beam combination comprises a laser source that generates a primary laser beam, a splitter that splits the primary laser beam into N secondary beams, an amplifying body having N channels, one for each secondary beam, and a recombination unit that recombines the N secondary beams, thereby forming an output beam focused on a target.

In fact, the possibility to obtain a high-power laser beam from the amplification of a single laser source is limited by non-linear optical effects and thermal effects.

On the other hand, in a coherent beam combination system, the N channels are individually amplified and then recombined with each other.

This allows to use the recombination of the amplified beams to obtain a high power output.

If the amplified beams are coherent one with the other, the amplified beams interfere with each other. In particular, it is desired that the amplified beams interfere constructively with each other.

In fact, in a theoretical case, if the amplified beams are coherent with each other and have a mutual phase-shift equal to zero or a multiple of $2\pi$, then the recombined beam has a peak intensity proportional to $N^2$, wherein N is the number of channels of the CBC system.

On the other hand, if the beams are not coherent with each other, the intensity of the recombined beam is just proportional to N.

However, maintaining the amplified beams coherent with each other and phase-locked with each other require an accurate control of the phase of the amplified beams.

The Applicant has verified that the known CBC systems have a low efficiency with respect to the theoretical case.

SUBJECT AND SUMMARY OF THE INVENTION

The aim of the present invention is to overcome the disadvantages of the prior art.

The present invention relates to a coherent beam combination system and to a control method thereof, as claimed in the appended claims.

BRIEF DESCRIPTION OF THE DRAWINGS

FIG. 5A shows a flow chart of an optimization algorithm of the phase-locking method of FIG. 5, according to an embodiment.

DETAILED DESCRIPTION OF PREFERRED EMBODIMENTS OF THE INVENTION

The following description is provided to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Unless otherwise defined, all technical and scientific terms used herein have the same meaning as commonly understood by one of ordinary skill in the art to which the embodiments disclosed belongs. In the case of conflict, the present specification, including definitions, will control. In addition, the examples are illustrative only and not intended to be limiting.

For the purposes of promoting understanding of the embodiments described herein, reference will be made to certain embodiments and specific language will be used to describe the same. The terminology used herein is for the purpose of describing particular embodiments only, and is not intended to limit the scope of the present disclosure.

Figure 1:
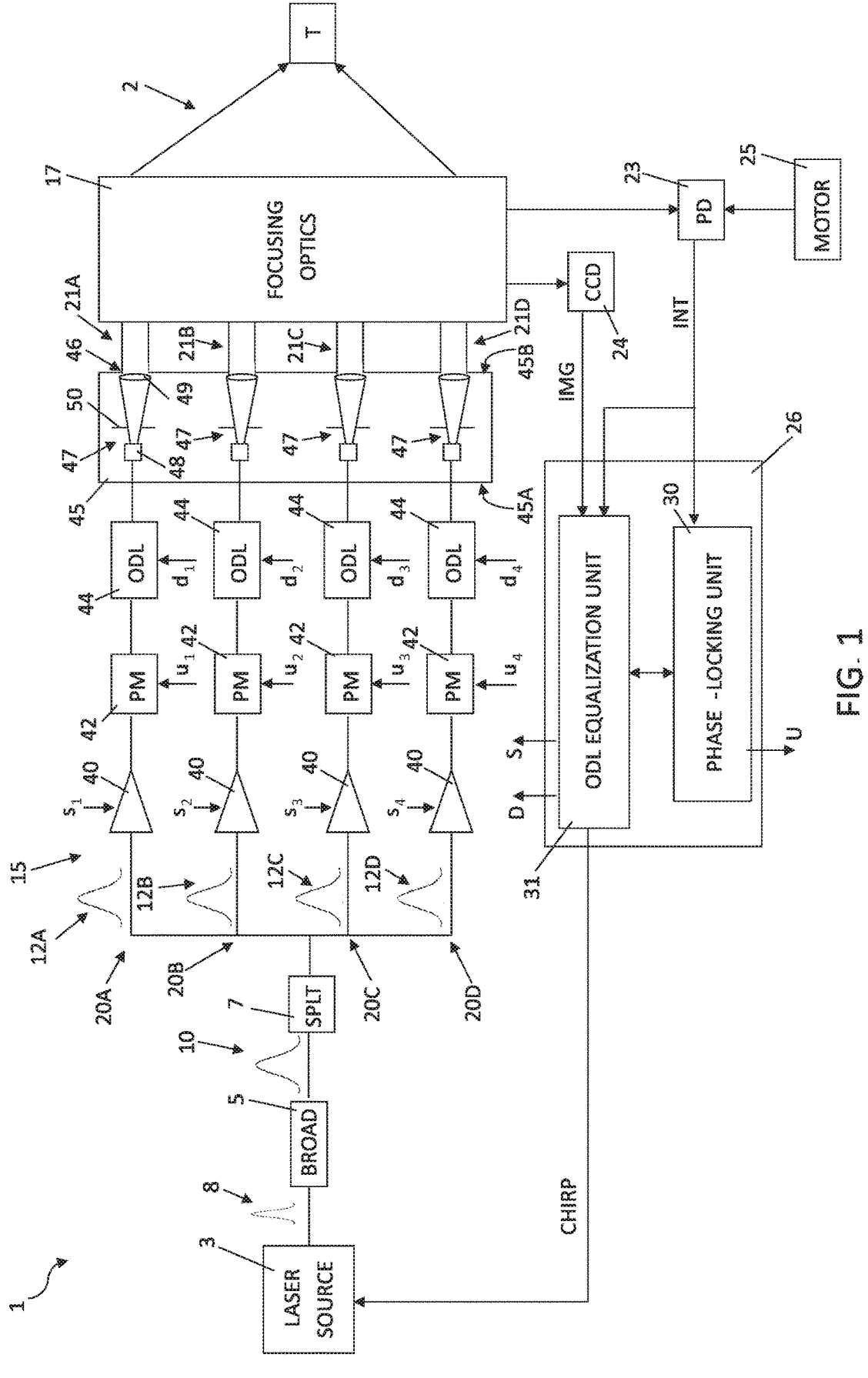
FIG. 1 shows a block diagram of a coherent combination system, according to an embodiment of the present invention.

FIG. 1 shows a block diagram of a coherent beam combination (CBC) system 1 configured to provide an output recombined beam 2 having a high peak intensity, for example up to tens of kW, directed onto a target T.

The CBC system 1 may be used for example for space debris removal, spectroscopy and laser-shaping applications, Point-to-Point communication in air (such as air-air, ground-air, air-space, ground-space), as a counter for Unmanned Aerial System, improvised explosive devices or as a dazzling system.

The CBC system 1 comprises a laser source 3, a beam broadener 5 and a splitter 7, optically coupled with each other, in particular through an optical fibre.

The laser source 3 generates a primary laser beam 8 having a narrow linewidth, for example below 20 kHz, the beam broadener 5 generates a broadened beam 10 from the primary laser beam 8, and the splitter 7 splits the broadened beam 10 into N secondary beams, of which here only a first, a second, a third and a fourth secondary beam 12A, 12B, 12C, 12D are shown.

The CBC system 1 further comprises a main body 15, optically coupled with the splitter 7, and a focusing optics 17, optically coupled with the main body 15.

The main body 15 comprises a plurality of channels, one for each secondary beam. In detail, with reference to FIG. 1, the main body 15 has a first, a second, a third and a fourth channel 20A, 20B, 20C, 20D, each receiving a respecting secondary beam 12A, 12B, 12C, 12D and providing a respective intermediate beam 21A, 21B, 21C, 21D.

The focusing optics 17 receives the intermediate beams 21A-21D and is configured to recombine the intermediate beams 21A-21D and generate the recombined output beam 2 directed onto the target T.

The focusing optics 17, as discussed in detail hereinafter with respect to FIG. 4, directs part of the intermediate beams 21A-21D towards an intensity sensor, here a photodiode 23, and towards an image sensor, here a CCD camera 24.

In this embodiment, the photodiode 23 is coupled to a motor 25, for example a piezoelectric actuator, which is configured to move the photodiode 23 along one or more axis, in particular here along three orthogonal axis X, Y, Z.

The CBC system 1 further comprises a control unit 26 including a phase-locking unit or module 30 and a delay compensation unit or module 31.

In this embodiment, the laser source 3 is a fibre laser, in particular a single-mode DFB fibre laser having a low-intensity noise and a high beam quality, for example with an $M^2$ factor smaller than 1.05.

The laser source 3 is substantially a monochromatic laser, for example having a wavelength of 1064 nm. However, the wavelength of the primary beam 8 generated by the laser source 3 may be different, depending on the specific application.

According to an embodiment, the laser source 3 may be configured to provide a variable-wavelength the primary beam 8.

The laser source 3 may be a continuous wave laser source or a pulsed laser source, here a continuous wave laser source.

The beam broadener 5, for example a chirp modulator, a sinusoidal modulator or a noise modulator, enlarges the linewidth of the primary beam 8. For example, the broadened beam 10 may have a linewidth of about tens of GHz, in particular up to 50 GHz.

Figure 2:
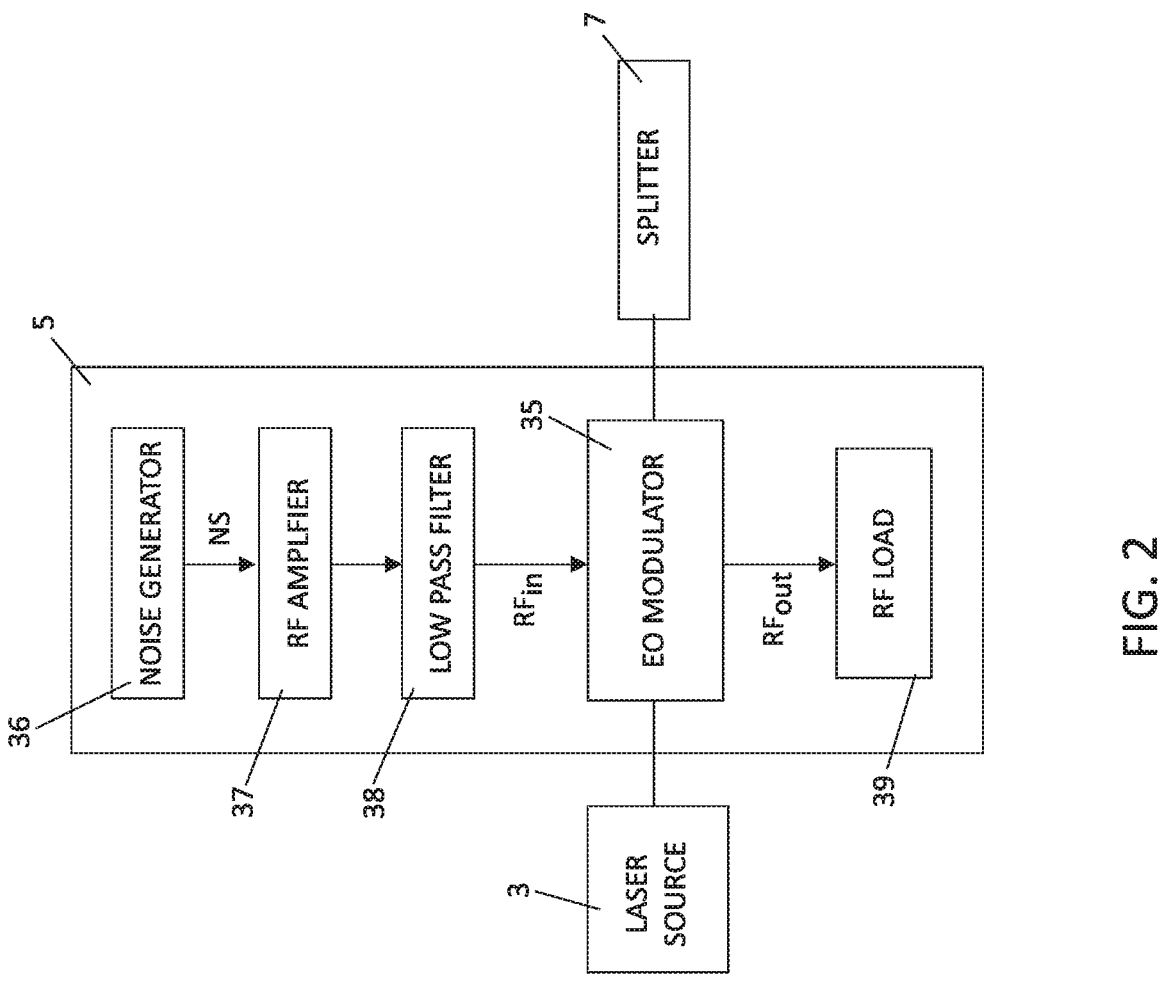
FIG. 2 shows in detail the block diagram of a portion of the present CBC system, according to an embodiment.

FIG. 2 shows an embodiment of the beam broadener 5, here a noise-modulated broadener, comprising a phase modulator 35, in particular an electro-optical modulator, coupled between the laser source 3 and the splitter 7 and driven by an rf input signal $RF_{in}$.

In detail, the beam broadener 5 comprises a noise generator 36 that generates a noise signal NS, for example a noise waveform or a pseudorandom binary sequence (PRBS), an rf amplifier 37 amplifying the noise signal NS and a low-pass filter 38 that filters the amplified noise signal, thereby generating the rf input signal $RF_{in}$.

The low-pass filter 38 allows to set the bandwidth of the rf input signal $RF_{in}$ and, therefore, the optical bandwidth modification of the primary beam 8.

According to an embodiment, the low-pass filter 38 may also comprise signal-shaping modules to modify the spectral shape of the rf input signal $RF_{in}$, depending on the specific application.

The beam broadener 5 also comprises a termination load 39, which receives an rf output signal $RF_{out}$ generated by the phase modulator 35 starting from the rf input signal $RF_{in}$. The termination load 39 may be used for impedance matching and as a heatsink, to dissipate the heat generated by the rf input signal $RF_{in}$ in the phase modulator 35.

The channels 20A-20D of the main body 15 each comprise an amplifier 40, a phase modulator 42, an optical delay line 44, and an aperture combiner 46, optically coupled with each other, in particular here through a respective optical fibre.

The amplifier 40 of each channel 20A-20D is coupled to a respective optic fibre extending from the splitter 7 and carrying the respective secondary beam 12A-12D. The amplifiers 40 of each channel 20A-20D amplify the respective secondary beam 12A-12D.

The amplifiers 40 each have a respective gain, for example fixed or variable, comprised, for example, between 10 and 109.

The control unit 26, in particular here the delay equalization unit 31, may provide a signal S to the amplifiers 40, which control one or more parameters of the amplifiers 40.

In detail, the signal S comprises a plurality of beam-control signals $s_1$, $s_2$, $s_3$, $s_4$, one for each amplifier 40.

For example, the beam-control signals $s_1$, $s_2$, $s_3$, $s_4$ may each control the gain of the amplifier 40 of a respective channel 20A-20D.

According to an embodiment, the beam-control signals $s_1$, $s_2$, $s_3$, $s_4$ may each command the switching on and the switching off of the respective amplifier 40, thereby commanding the activation and de-activation of the respective channel 20A-20D. The phase modulators 42, for example each formed by an electro-optical modulator or a fibre stretcher, receive a phase control signal U, for example a voltage signal, from the phase-locking unit 30.

In detail, the phase modulator of each channel 20A-20D receives a respective phase control signal $u_1$, $u_2$, $u_3$, $u_4$, for example a voltage signal, from the phase-locking unit 30.

The phase control signals $u_1$, $u_2$, $u_3$, $u_4$ control the phase variations undergone by the secondary beams 12A-12D that, after being amplified by the respective amplifier 40, propagates through the respective phase modulator 42.

The phase modulators 42 may for example be manufactured as a waveguide, by using a proton-exchanged process, in order to obtain a high stability even at high optical power.

The optical delay lines 44 are variable delay lines that set the length of the optical path of the respective channel 20A-20D and receive a delay control signal D from the delay equalization unit 31. In detail, the optical delay lines 44 receive each a respective delay control signal $d_1$, $d_2$, $d_3$, $d_4$ from the delay equalization unit 31.

In practice, the delay control signals $d_1$, $d_2$, $d_3$, $d_4$ may each tune the physical length of the respective optical delay line 44 and/or may change the refractive index of the respective optical delay line 44.

For example, the optical delay lines 44 may be fibre stretchers or folded delay lines.

According to an embodiment, the optical delay lines 44 may each comprise a fibre input coupled to the respective phase modulator 42, a fibre output coupled to the beam combiner 45 and a movable opto-mechanical element, such as a retroreflector, arranged between the fibre input and the fibre output that reflects the respective secondary beam 12A-12D coming from the fibre input towards the fibre output. By moving the movable retroreflector it is possible to change the length of the path travelled by the respective secondary beam 12A-12D and, therefore, the length of the optical path of the respective channel 20A-20D.

For example, if the optical delay lines 44 comprise said movable opto-mechanical element, the delay control signals $d_1$, $d_2$, $d_3$, $d_4$ may control an actuator, for example a piezoelectric actuator, configured to move the movable opto-mechanical element.

The beam combiner 45 has a back coupling portion 45A, receiving the secondary beams 12A-12D propagating from the optical delay lines 44, and a front coupling portion 45B having a plurality of apertures 46, each providing a respective intermediate beam 21A-21D.

The apertures 46 are arranged, on the front coupling portion 45B, in a tiled-aperture configuration, in particular in a honeycomb configuration, which allows a high scalability in the number of channels.

However, the apertures 46 may be arranged, on the coupling portion 45B, in a different configuration, depending on the specific application and/or on the desired filling factor.

Figure 3:
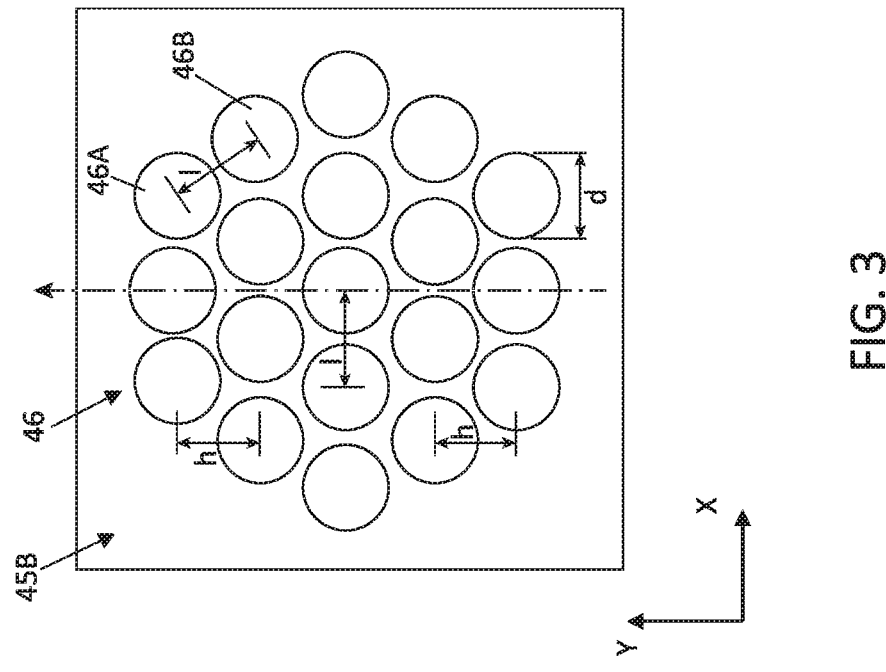
FIG. 3 shows in detail the block diagram of a different portion of the present CBC system, according to an embodiment.

By way of example only, FIG. 3 shows an example of the coupling portion 45B, in a case wherein the CBC system 1 has nineteen apertures 46 arranged in a honeycomb configuration.

The apertures 46 have a circular cross section having a diameter d defining the beam waist of the intermediate beams 21A-21D.

In the honeycomb configuration, two adjacent apertures 46A, 46B are arranged at a distance 1, for example measured between the centres of the two adjacent apertures 46A, 46B.

Still with reference to the exemplificative configuration of FIG. 3, the apertures 46 are arranged along an axis X in order to form a plurality of rows mutually spaced along an axis Y perpendicular to the axis X.

In this embodiment, two rows that are adjacent along the axis Y are arranged at a distance h measured in a direction parallel to the axis Y. For example, the distance h may be measured between the centres of two apertures of two adjacent rows.

The distance h may be expressed as a function of the distance 1 by the formula: $h = 1 \cdot \sqrt{3}/2$.

Again with reference to FIG. 1, the beam combiner 45 comprises a plurality of opto-mechanical elements 47, one for each channel 20A-20D, which couples the respective secondary beam 12A-12D propagating from the delay line 44 to the aperture 46.

In detail, each opto-mechanical element 47 comprises a fibre connector 48 and an optical element 49, arranged at the respective aperture 46.

The fibre connector 48 is coupled to the optical fibre extending from the optical delay line 44. The secondary beams 12A-12D coming from the optical delay lines 44 propagate in free space between the fibre connector 48 and the respective optical element 49.

The optical element 49, for example a converging lens, collimates the respective secondary beam 12A-12D propagating from the fibre connector 48, thereby generating the respective intermediate beam 21A-21D.

For example, the fibre connector 48 may be placed at the focus plane of the respective optical element 49.

Moreover, in this embodiment, each opto-mechanical element 47 further comprises an intensity mask 50 arranged between the respective fibre connector 48 and the respective optical element 49.

The intensity mask 50 may reduce the beam waist of the beam propagating from the fibre connector 48 and the optical element 49, so that only a portion of the secondary beam 21A-21D, for example comprised between 95% and 100%, in particular of about 95%, is transmitted and forms the respective intermediate beam 21A-21D, while the remaining portion, for example comprised between 5% and 0%, in particular of about 5%, of the respective secondary beam 21A-21D is blocked.

The intensity mask 50 allows to optimise the filling factor of the apertures 46 on the front coupling portion 45B of the beam combiner 45.

Figure 4:
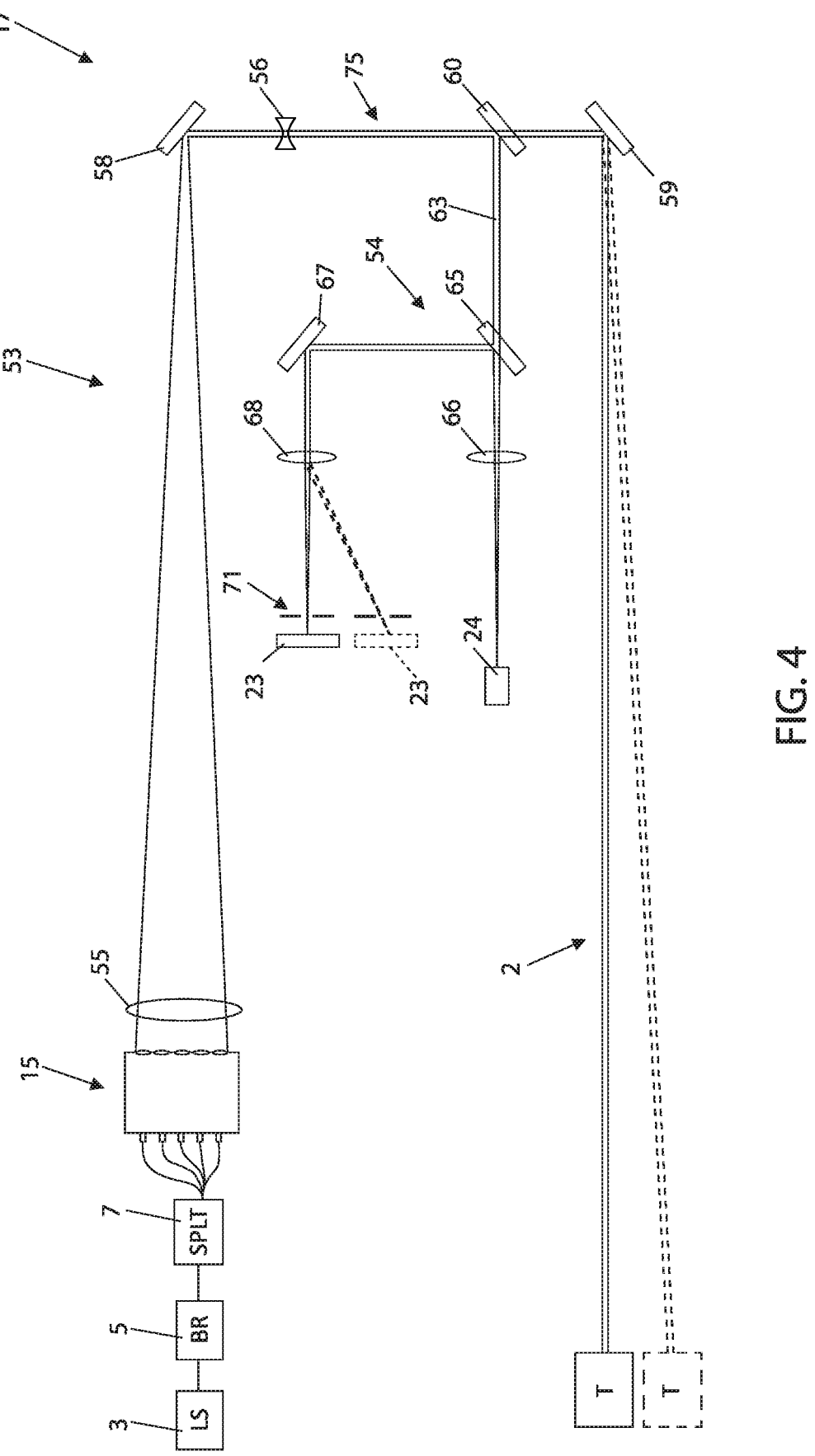
FIG. 4 shows a detailed block diagram of another portion of the CBC system of FIG. 1, according to an embodiment.

FIG. 4 shows the CBC system 1, wherein a detailed embodiment of the focusing optics 17 is illustrated.

The focusing optics 17 defines a primary optical path 53, which directs a first portion of the intermediate beams 21A-21D towards the target T, and a secondary optical path 54, which directs a second portion of the intermediate beams 21A-21D towards the photodiode 23 and the CCD camera 24.

In detail, the primary optical path 53 of the focusing optics 17 forms a two-lens optical system comprising a convex lens 55 having a focus length $f_1$ and arranged in front of the front coupling face 45B of the beam combiner 45, and a concave lens 56 having a focus length $f_2$ and optically coupled to the first lens 55.

The first and the second lenses 55, 56 allow the mutual recombination of the intermediate beams 21A-21D, thereby forming a recombined beam 75.

The recombined beam 75 is generated by the interference of the intermediate beams 21A-21D. Therefore, the wavefront of the recombined beam 75 forms an interference pattern having a main lobe and one or more secondary lobes (as for example shown in FIG. 7).

Moreover, the position of the concave lens 56 along the primary optical path 53 may be changed, in use, so that the two-lens system formed by the convex lens 55 and the concave lens 56 has a variable focal length.

For example, the focal length of the two-lens system may be changed depending on the distance of the target T from the CBC system 1.

For example, the concave lens 56 may be coupled to a DC actuator, here not shown, configured to move the concave lens 56 in order to reduce or increase the distance between the convex lens 55 and the concave lens 56.

In this embodiment, the focusing optics 17 further comprises a first mirror 58, arranged along the primary optical path 53 between the first lens 55 and the second lens 56, and a second mirror 59, arranged along the primary optical path 53 between the concave lens 56 and the target T.

In practice, the first and the second mirrors 58, 59 are arranged so that the primary optical path 53 is folded, thereby reducing the occupancy of the CBC system 1.

The focusing optics 17 also comprises a beam splitter 60 arranged along the primary optical path 53, in particular here between the concave lens 56 and the second mirror 59.

The beam splitter 60 splits the recombined beam 75 propagating from the concave lens 56, thereby forming a sample beam 63 propagating along the secondary optical path 54.

The beam splitter 60 samples a small portion, for example 1% or even less, of the recombined beam 75, depending on the power of the recombined beam 75, and the maximum optical power sustained by the photodiode 23 and the CCD camera 24.

In detail, the secondary optical path 54 comprises a beam splitter 65, a CCD lens 66, a mirror 67 and a photodiode lens 68.

The beam splitter 65 further splits the sample beam 63 so that a first portion is focused by the CCD lens 66 on the CCD camera 24 and a second portion is directed towards the photodiode 23 by the mirror 67 and focused thereto by the photodiode lens 68.

The CCD lens 66 and the photodiode lens 68 may be chosen depending on a desired size of the main lobe of the portion of the recombined beam 75 that is directed towards the CCD camera 24 and, respectively, the photodiode 24. For example, the CCD lens 66 and the photodiode lens 68 may be chosen so that the size of the main lobe of the recombined beam 75 is equal to or smaller than the active area of the photodiode 23 and, respectively, of the CCD camera 24.

In this embodiment, the secondary optical path 54 also comprises a pinhole 71 arranged between the photodiode lens 68 and the photodiode 23. The pinhole 71 has an aperture approximately equal to the size of the main lobe of the beam propagating from the photodiode lens 68. For example, the aperture of the pinhole 71 may be comprised between 10 μm and 100 μm, in particular of about 100 μm.

In practice, the photodiode 23 may measure only the intensity of the main lobe of the beam propagating from the photodiode lens 68.

The photodiode 23 provides an intensity signal INT, which is indicative of the intensity of the recombined beam 75, in particular here of the main lobe of the recombined beam 75. In fact, by knowing the splitting characteristics of the first and the second beam splitters 60, 65, the intensity signal INT may be used to obtain the intensity of the main lobe of the recombined beam 75.

In use, the phase-locking unit 30 receives the intensity signal INT from the photodiode 23 and provides the phase-control signals $U=\{u_1, u_2, u_3, u_4\}$ to the phase modulators 42 of the channels 20A-20D.

The phase-locking unit 30 performs a closed-loop optimization algorithm that modifies the phase-control signal U so to maximise the intensity measured by the photodiode 23.

Figure 5:
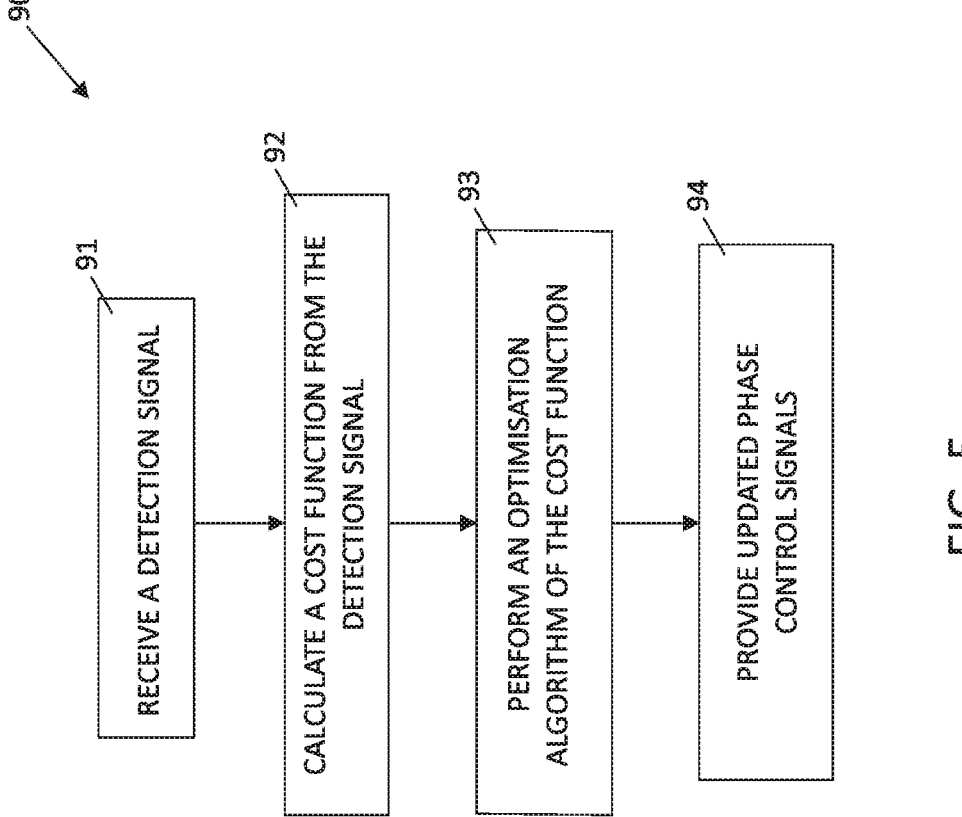
FIG. 5 shows a flow chart of a phase-locking method for controlling the CBC system of FIG. 1.

FIG. 5 shows a flow chart of a method 90 performed by the phase-locking module 30 to maximise the intensity measured by the photodiode 23.

At a step 91, the phase-locking module 30 receives a detection signal, here the intensity signal INT from the photodiode 23.

At a step 92, the phase-locking module 30 calculates a cost function from the detection signal, wherein the cost function is a function of the intensity detected by the photodiode 23.

At a step 93, the phase-locking module 30 performs an optimisation algorithm that is configured to maximise the intensity measured by the photodiode 23.

At a step 94, the phase-locking module 30 provides a plurality of updated phase control signals to the phase modulators 42, based on an output of the optimization algorithm.

According to an embodiment, as shown in FIG. 5A, the phase-locking unit 30 performs, as optimization algorithm, a method 100 based on a Stochastic Parallel Gradient Descent (SPGD) algorithm.

In an initialization step 103, the phase-locking unit 30 initializes the phase values of the secondary beams 12A-12D at an initial phase. In detail, the phase-locking 30 provides an initial phase signal $U_0$ to the phase modulators 42. For example, the initial phase signal $U_0$ may provide the same phase signal to the modulator 42 of each channel 20A-20D, i.e. $U_0=\{u_0, u_0, u_0, u_0\}$.

However, the phase-locking unit 30 may apply a different phase values to the phase modulators 42, depending on the specific application.

The method 100 is an iterative method. Each iteration will be indicated by the index k. Moreover, in the following, the index j will be used to identify any one of the channels 20A-20D.

At each iteration k, the phase-locking unit 30 generates, step 105, a phase-perturbation vector $\delta u(k)=\{\delta u_1, \delta u_2, \delta u_3, \delta u_4\}$ comprising a plurality of perturbation voltages $\delta u_1, \delta u_2, \delta u_3, \delta u_4$, one for each phase modulator 42.

In detail, the perturbation voltages $\delta u_1, \delta u_2, \delta u_3, \delta u_4$ are generated according to a Bernoulli distribution having values $v_1$ and $v_2$ wherein $v_2$ is different from $v_1$ and wherein $P(\delta u_j=v_1)=p$ and $P(\delta u_j=v_2)=1-p$.

Therefore, each perturbation voltage $\delta u_j$ may have either the value $v_1$ or $v_2$ with a probability p and, respectively, $1-p$.

According to an embodiment, the values $v_1$ and $v_2$ have the same modulus and opposite sign, i.e. $v_1=-v_2$.

According to an embodiment, p=0.5, so that $P(\delta u_j=v_1)=P(\delta u_j=v_2)=0.5$.

According to an embodiment, $v_1=-v_2$ and p=0.5.

Then, step 107, the phase phase-locking unit 30 provides a phase control signal $U=U(k-1)+\delta u(k)=\{u_1(k-1)+\delta u_1, u_2(k-1)+\delta u_2, u_3(k-1)+\delta u_3, u_4(k-1)+\delta u_4\}$ to the phase modulators 42.

In practice, the phase-locking unit 30 sums the phase-perturbation vector $\delta u(k)$ to the phase control signal $U(k-1)=\{u_1(k-1), u_2(k-1), u_3(k-1), u_4(k-1)\}$ that has been determined in the previous iteration k−1.

At the first iteration, i.e. for k=1, the phase-perturbation vector $\delta u(k)$ is summed to the initial phase signal $U_0$.

Therefore, at step 107 the phase modulators 42 change the phase values of the secondary beams 12A-12D propagating in the respective channels 20A-20D, with respect to the phase values provided in the previous iteration k−1.

Since the phases of the secondary beams 12A-12D have been changed with respect to the previous iteration k−1, also the interference pattern formed by the recombination of the intermediate beams 21A-21D changes. Accordingly, the intensity of the main lobe measured by the photodiode 23 changes.

The photodiode 23 measures a positive intensity $I_{+, k}$, which is indicative of the intensity change in the recombined beam 75 caused by the phase control signal $U(k-1)+\delta u(k)$.

The phase locking unit 30, step 109, receives the intensity signal INT from the photodiode 23.

The phase-locking unit 30 calculates, step 111, a positive cost function $J_{+,k}$ given by $I_{+, k}/I_{max}$, wherein $I_{max}$ is the maximum intensity that may be achieved if the intermediate beams 21A-21D are perfectly matched, i.e. if the mutual phase difference among the intermediate beams 21A-21D is 0 or an integer multiple of $2\pi$.

Then, step 113, the phase phase-locking unit 30 provides a phase control signal $U_c=U(k-1)-\delta u(k)=\{u_1(k-1)-\delta u_1, u_2(k-1)-\delta u_2, u_3(k-1)-\delta u_3, u_4(k-1)-\delta u_4\}$ to the phase modulators 42.

In practice, the phase-locking unit 30 subtracts the phase-perturbation vector $\delta u(k)$ from the phase control signal $U(k-1)$ that has been determined in the previous iteration k−1.

At the first iteration, i.e. for k=1, the phase-perturbation vector $\delta u(k)$ is subtracted to the initial phase signal $U_0$.

Therefore, at step 113 the phase modulators 42 change the phase values of the secondary beams 12A-12D propagating in the respective channels 20A-20D, with respect to the phase values provided in the previous iteration k−1 and with respect to the phase provided at step 107.

The photodiode 23 measures a negative intensity $I_{-,k}$, which is indicative of the intensity change in the recombined signal caused by the phase control signal $U(k-1)-\delta u(k)$.

The phase locking unit 30, step 115, receives the intensity signal INT from the photodiode 23.

The phase-locking unit 30 calculates, step 117, a negative cost function $J_{-k}$ given by $I_{-,k}/I_{max}$.

Then, step 119, the phase-locking unit 30, calculates a new phase control signal $U(k)$ by updating the phase control signal $U(k-1)$ based on the phase-perturbation vector $\delta u(k)$ and the positive and negative cost functions $J_{+,k}$, $J_{-,k}$.

In detail, in this embodiment, the new phase control signal $U(k)$ is calculated as $U(k)=U(k-1)+\delta u(k)\cdot\gamma\cdot\delta J(k)$, wherein $\gamma$ is a gain value and $\delta J(k)$ is the difference between the positive and the negative cost functions $J_{+,k}$, $J_{-,k}$ e.g. $\delta J(k)=J_{+,k}-J_{-,k}$.

The gain value $\gamma$ may be chosen by a user of the CBC system 1, for example during the calibration of the CBC system 1.

The phase-locking unit 30, step 121, provides the new phase control signal $U(k)$ to the phase modulators 42.

Therefore, at step 121 the phase modulators 42 update the phase of the secondary beams 12A-12D, based on the new phase control signal $U(k)$.

The photodiode 23 measures a corrected intensity $I_{corr,k}$, which is indicative of the change of intensity of the recombined signal 75 caused by the new phase control signal $U(k)$.

The phase locking unit 30, step 123, receives the intensity signal INT from the photodiode 23.

The phase-locking unit 30 then calculates, step 125, a corrected cost function $J_{corr,k}$ as $I_{corr,k}/I_{max}$.

The phase-locking unit 30 verifies, step 127, a convergence condition of the optimization method 100.

In detail, in this embodiment, the phase-locking unit checks if the corrected cost function $J_{corr,k}$ is equal to or higher than a convergence threshold $J_{th}$, which may be for example chosen by a user during a calibration step of the CBC system 1.

If the convergence condition is not verified, i.e. here if the corrected cost function $J_{corr,k}$ is lower than the convergence threshold $J_{th}$ (branch N output from step 127), the phase-locking unit 30 returns to step 105 and generate a new random perturbation vector $\delta u(k+1)$ for the next iteration k+1.

The phase locking unit 30 then repeats all steps from 107 to 127.

On the other hand, if the convergence condition is verified, branch Y output from step 127, the phase-locking unit 30 returns to step 123 and repeats steps 123, 125 and 127.

In practice, if the convergence condition is verified, the phase-locking unit 30 keeps monitoring the cost function by acquiring the intensity signal INT (step 123) and by calculating the associated cost function (step 125), until the convergence condition is not verified anymore.

For example, in response to the convergence condition being verified (branch Y output from step 127), the phase-locking unit 30 may immediately return to step 123 or may wait a time interval, which may be chosen depending on the specific application, before returning to step 123.

During use, the phases of the secondary beams 12A-12D may be subject to unwanted changes caused by external factors. For example, a temperature drift may change the length of the optical fibres wherein the secondary beams 12A-12D propagate, thereby causing an unwanted phase shift among the secondary beams 12A-12D, which may degrade the mutual phase locking thereof.

The method 100 allows to adjust the phases of the secondary beams 12A-12D in a closed loop, so that the intensity of the main lobe of the recombined beam 75 is kept at a maximum value.

Moreover, the Applicant has verified that the method 100 allows also to reduce the power noise of the recombined beam 75 caused by optical phase fluctuations, in particular in a frequency range of said fluctuations comprised between 0 Hz and 2000 Hz.

Moreover, the fact that the phase-locking unit 30 keeps monitoring the cost function even after the convergence condition has been satisfied (branch Y from step 127), allows the method 100 to achieve a high speed of convergence and at the same time to keep high the performance of the CBC system 1.

The method 100 may also be used as a method to steer the output recombined beam 2, for example to track the target T if the target T has moved to a different position (as for example indicated by a dashed line in FIG. 4).

Figures 5B, 5C, 7:
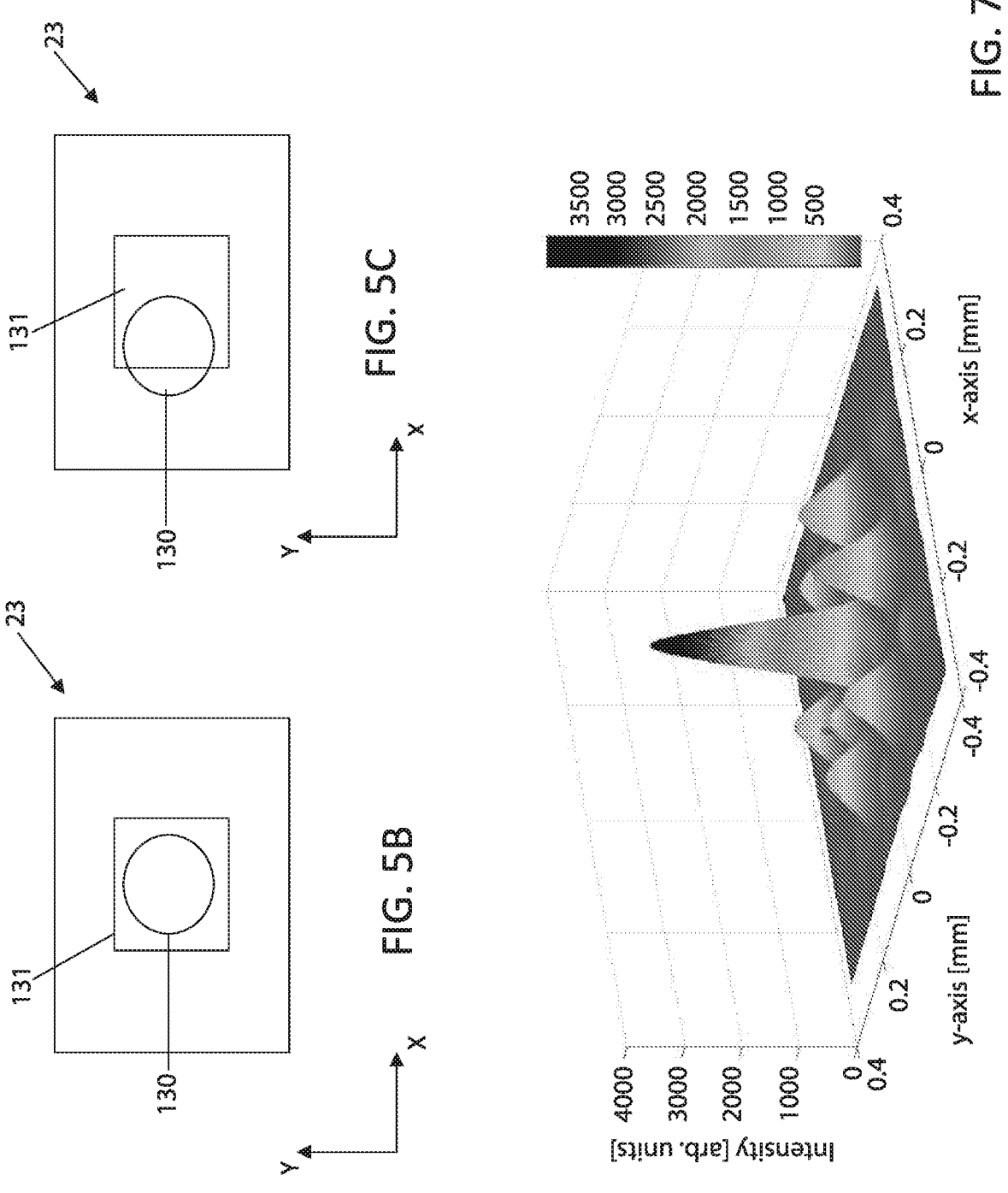
FIGS. 5B and 5C show schematic top plan views of an intensity sensor of the CBC system of FIG. 1, in use, in two different conditions of use.
FIG. 7 shows an example of the intensity distribution of a recombined laser beam obtainable by the CBC system of FIG. 1.

FIG. 5B shows an example of a schematic top plan view of the photodiode 23, wherein the beam spot 130 of the portion of the recombined beam 75 focused by the photodiode lens 68 falls completely within an active area 131 of the photodiode 23. In this case, by supposing that the phase-locking unit 30 has verified the convergence condition, the mutual phase shift among the secondary beams 12A-12D is optimised and the main lobe of the recombined beam 75 has a maximum intensity.

If, as shown in FIG. 5C, the photodiode 23 is moved along a first and a second axis X, Y, the beam spot 130 may fall only in part within the active area 131.

The movement of the photodiode 23 is controlled by the motor 25, for example a piezoelectric actuator having a high accuracy, e.g. able to cause a displacement of the photodiode 23 comprised between 10 μm and 25 mm.

The motor 25 may be controlled by the control unit 26.

In response to the displacement of the photodiode 23, the photodiode 23 detects a reduction in the measured intensity.

Accordingly, when the phase-locking unit 30 acquires the intensity signal INT (step 123) and calculates the cost function J (step 125), the convergence condition may not be verified anymore (step 127). Therefore, the phase-locking unit 30 returns to step 105 and performs one or more new iterations (from step 105 to step 127) until the convergence condition is satisfied.

In fact, by changing the phase applied by the phase modulators 42, the phase-locking unit 30 is able to change the position of the recombined beam 75, in particular is able to move the main lobe of the recombined beam 75, for example until the beam spot 130 falls again completely within the active area 131.

In practice, by moving the photodiode 23, it is possible to steer the recombined beam 75 and, therefore, the output recombined beam 2.

The Applicant has verified that the method 100 allows to achieve a very fast and accurate beam steering, for example to accurately control the position of the output recombined beam 2 at the target T. For example, even when the target T is placed at a distance of about 100 m from the CBC system 1, by moving the photodiode 23 with the motor 25, the CBC system 1 may be able to adjust the position of beam, at the location of the target T, even by few micrometres.

Figure 6:
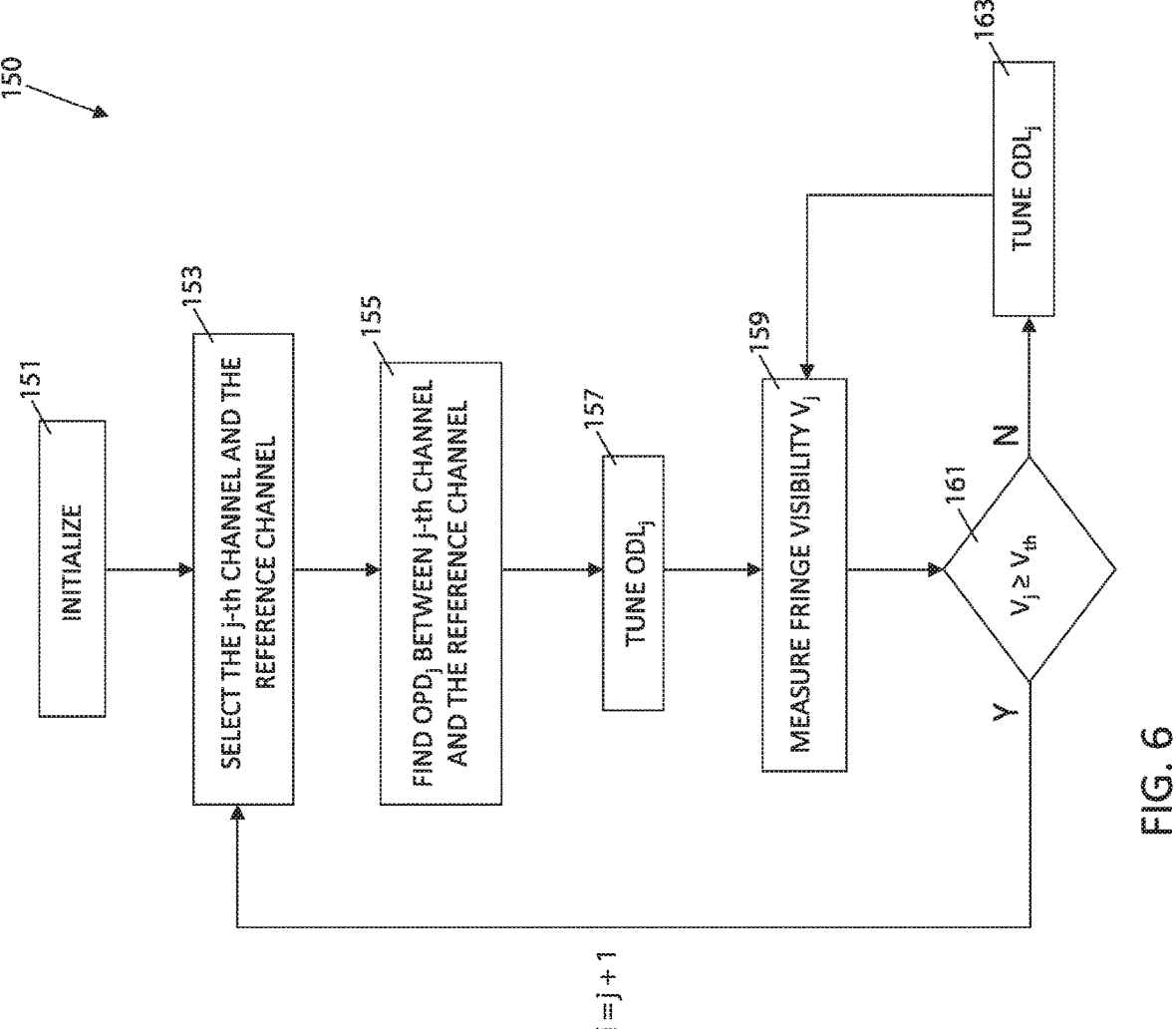
FIG. 6 shows a flow chart of a delay equalization method for controlling the CBC system of FIG. 1.

According to an embodiment, the optical delay lines 44 may be variable delay lines. FIG. 6 shows a flow chart of a method 150 performed by the delay optimization unit 31 for equalizing the optical paths of the secondary beams 12A-12D in the channels 20A-20D, according to an embodiment.

The method 150 starts, step 151, if the delay optimization unit 31 verifies that the optical paths of the channels 20A-20D need to be equalized.

For example, the method 150 may be performed during a calibration of the CBC system 1, for example before a first use of the CBC system 1, or may be performed periodically, during use, for example upon verification of a specific condition.

The delay optimization unit 31 selects, step 153, one of the channels 20A-20D to be equalized and sets one of the channels 20A-20D as reference channel.

For example, hereinafter, the first channel 20A is taken as the reference channel and the second channel 20B as the channel to be equalized.

However, any of the channels 20A-20D may be taken as reference channel. For example, if the channels 20A-20D are arranged in a honeycomb structure in the aperture combiner 45, the channel whose aperture is arranged at the centre of the honeycomb structure may be taken as reference channel.

At step 153, the delay optimization unit 31 selects the first channel 20A and the second channel 20B by turning off the third channel 20C and the fourth channel 20D.

For example, the third channel 20C and the fourth channel 20D may be turned off by stopping the emission of the corresponding amplifier 40. For example, the delay optimization unit 31 may provide the signals $s_3$ and $s_4$ so that the respective amplifiers 40 block the propagation of the third and fourth intermediate beams 21C and 21D.

Then, step 155, the delay optimization unit 31 determines a coarse estimate of the optical path difference between the second channel 20B and the reference channel 20A. For example, the coarse estimate may have an accuracy comprised between few centimetres and several meters of the optical path difference.

In this embodiment, the delay optimization unit 31 performs a Frequency Modulation Continuous Wave (FMCW) technique to find the coarse estimate of the optical path difference between the second channel 20B and the reference channel 20A.

In detail, the delay optimization unit 31 provides a chirp signal CHIRP to the laser source 3 and, in response thereto, acquires the intensity signal INT from the photodiode 23.

The chirp signal CHIRP has a chirp frequency a that causes a temporal modulation of the wavelength of the primary beam 8, in particular causes the wavelength of the primary beam 8 to follow a triangular ramp.

If there is a delay $OPD_2$ between the reference channel 20A and the second channel 20B, the intensity signal INT has a beat note at a beat frequency $f_b$.

The relation between the delay $OPD_2$ and the beat frequency $f_b$ is:

$$OPD_2 = \frac{c \cdot f_b}{\alpha \cdot n},$$

wherein c is the speed of light in vacuum and n is the refractive index of the medium through which the first and the second secondary beams 12A, 12B.

Then, step 157, the delay optimization unit 31 provides the delay control signal $d_2$ to the optical delay line 44 of the second channel 20B, in order to compensate for the delay $OPD_2$.

In practice, the delay control signal $d_2$ shortens or stretches the optical path of the optical delay line 44 of the second channel 20B, in order to compensate for the delay $OPD_2$.

For example, if the optical delay line 44 of the second channel 20B has a movable opto-mechanical element configured to change the length of the optical path of the optical delay line 44, then the delay control signal $d_2$ may control an actuator, for example a piezoelectric actuator, configured to move the optical delay line 44 of the second channel 20B.

Then, the delay optimization unit 31 finds a fine estimate of the optical path difference between the second channel 20B and the reference channel 20A.

In detail, step 159, the delay optimization unit 31 measures a fringe visibility $V_2$ from the image IMG received from the CCD camera 24.

At step 159, only the first channel 20A and the second channel 20B are activated; therefore, the recombined beam 75 is formed by the interference between the first and the second intermediate beams 21A. 21B.

Accordingly, the image IMG acquired by the CCD camera 24 represents the interference pattern between the first and the second intermediate beams 21A, 21B.

The fringe visibility $V_2$ may be defined as:

$$V_2 = \frac{I_+ - I_-}{I_+ + I_-},$$

wherein $I_+$ is the maximum value of intensity on the image IMG, e.g. the peak value of the main lobe of the interference pattern, and $I_-$ is the minimum value of intensity on the image IMG, e.g. a zero of the interference pattern.

The delay optimization unit 31 checks, step 161, if the fringe visibility $V_2$ satisfies an interference-quality condition. In this embodiment, the delay optimization unit 31 checks if the fringe visibility $V_2$ is equal to or higher than a fringe visibility threshold $V_{th}$, which may be chosen for example by a user during a calibration of the CBC system 1.

In the negative case, branch N at output from step 161, the delay optimization unit 31 updates, step 163, the delay control signal $d_2$ that is provided to the optical delay line 44 of the second channel 20B, in order to increase the fringe visibility $V_2$.

For example, the delay control signal $d_2$ is updated by using a known search or optimisation algorithm, such as a bisection algorithm.

If the optical delay line 44 of the second channel 20B has a movable opto-mechanical element, then the delay control signal $d_2$ is updated so that the optical delay line 44 of the second channel 20B is moved by the respective actuator, in order to shorten, or stretch, the optical path of the secondary beam 12B accordingly.

Then, the delay optimization unit 31 repeats step 159 to measure the updated fringe visibility $V_2$, and step 161 to check if the interference-quality condition has been satisfied.

When the interference-quality threshold has been reached, i.e. here when $V_2 \geq V_{th}$, branch Y at output from step 161, the delay optimization unit 31 returns to step 153 by selecting the j+1-th channel. The, in the example considered, the delay optimization unit 31 selects the third channel 20C.

Therefore, the delay optimization unit 31 activates the third channel 20C and deactivate the second channel 20B.

According to this embodiment, the first channel 20A is still used as reference channel.

The delay optimization unit 31 then repeats the steps from 155 to 163 for the third channel 20C.

After also the optical path of the third channel 20C has been equalized, the steps from 153 to 163 are repeated also for the fourth channels 20D.

FIG. 7 shows an experimental example of a 3D representation of the spatial distribution of the intensity of the portion of the sample beam 63 acquired by the CCD camera 24, in use. By taking into account the splitting characteristics of the first and the second beam splitters 60, 65, said distribution of intensity is indicative of the distribution of intensity of the recombined beam 75 and, therefore, of the output recombined beam 2 directed onto the target T.

By measuring the peak intensity of the main lobe, either from the image IMG acquired by the CCD camera 24 or by the intensity signal INT provided by the photodiode 23, it is possible to find the efficiency of the CBC system 1 by calculating the ratio of the peak intensity of the recombined beam 75 over the peak intensity of a single intermediate beam 21A-21D, e.g. $\eta = I_{max,CBC}/I_{max, SB}$.

Theoretically, the efficiency of the CBC system 1 should be equal to $N^2$, with N being the number of channels.

The Applicant has verified that the efficiency of the CBC system 1 may achieve a high value, close to the theoretical value.

In particular, for a CBC system having a number of channels N=7, the Applicant has found an experimental efficiency of 38.5, with respect to the theoretical value of $N^2$=49. Therefore, the CBC system may have an overall efficiency of about 79% with respect to the theoretical value.

Figure 9:
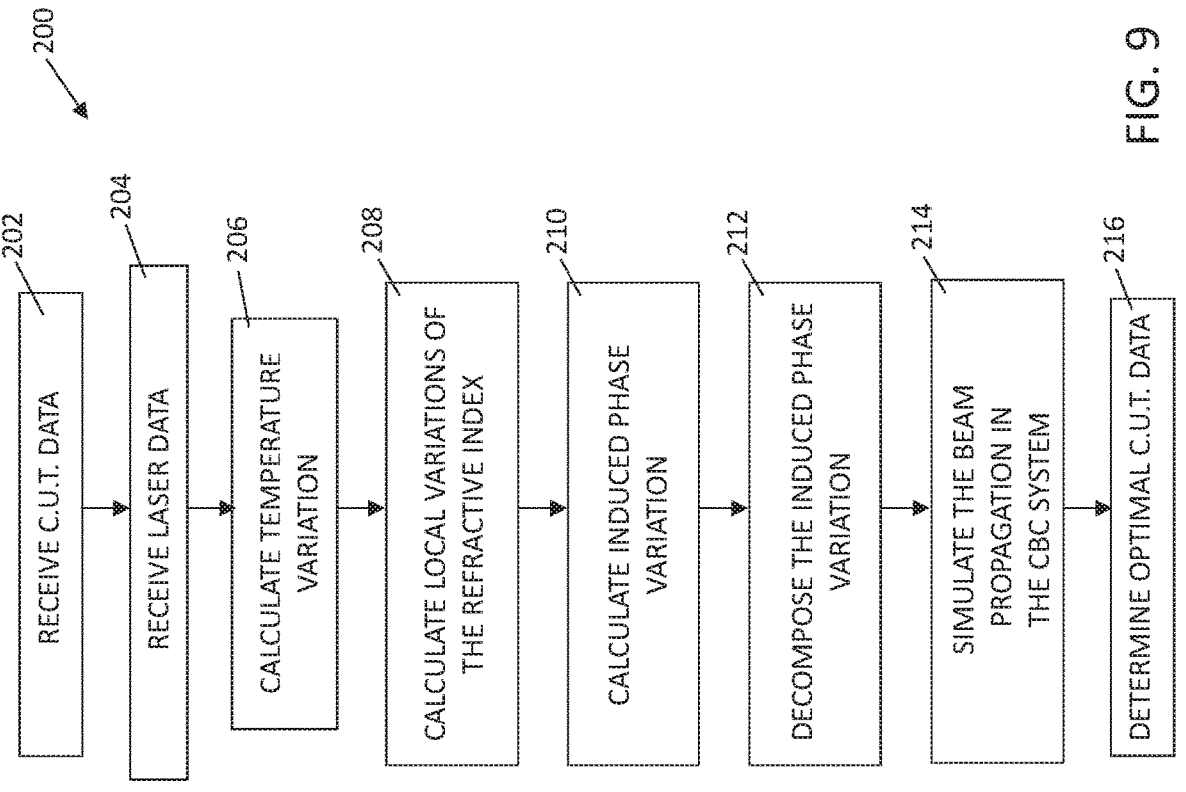
FIG. 9 shows a flow chart of a simulation method for controlling the CBC system of FIG. 1.
Figure 8:
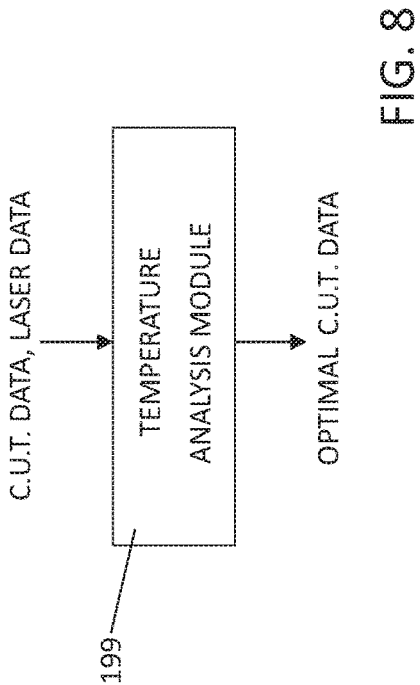
FIG. 8 shows a processor module of the CBC system of FIG. 1, according to an embodiment.

According to an embodiment, as shown in FIG. 8, the CBC system 1 may comprise also a temperature analysis unit or module 199 configured to perform a method, illustrated in FIG. 9 and indicated by 200, for simulating the effect of temperature variations on the CBC system 1, in particular of the temperature variations induced by the high optical power of the recombined beam 75.

In detail, the method 200 may be performed on a specific component of the CBC system 1, in order to optimise the parameters of said specific component.

In detail, the method 200 may be performed for any of the optical elements of the focusing optics 17. In fact, the recombined beam 75 may reach high optical power values, for example around tens of kW, that may cause high temperature variations in the optical elements of the focusing optics 17.

According to the method 200, at a step 202, the temperature analysis unit 199 receives data indicative of the properties of the component under test (hereinafter c.u.t. data). The component under test may be, for example, the convex lens 55 or the concave lens 56, or any other of the optical components of the focusing optics 17 shown discussed with reference to FIG. 4.

Said c.u.t. data may comprise, for example, the geometry of the component under test, the optical properties, in particular absorption, and thermal properties of the substrate material of the component under test.

At a step 204, the temperature analysis unit 199 receives laser data indicative of the properties of the laser beam to be analysed, i.e. here of the recombined beam 75, such as optical power, spot size and wavelength.

Then, step 206, the temperature analysis unit 199 uses the c.u.t. data and the laser data as input to solve a 3D partial differential heat equation of the component under test and provides at output a temperature map representing the temperature variations induced in the component under test by the propagation of the laser beam.

At a step 208, the temperature analysis unit 199 uses the temperature map as input to calculate the local variations of the refractive index of the component under test that are induced by the temperature variations. In detail, the unit 199 provides at output a map of the updated refractive index n(x, y, z, $\Delta T$), e.g. given by n(x, y, z, $\Delta T$)=$n_0$(x, y, z)+$\Delta n$(x, y, z, $\Delta T$), wherein the variation $\Delta n$ of the refractive index as a function of a temperature variation $\Delta T$ depends on the substrate material of the component under test.

Then, step 210, the unit 199 uses the updated refractive index n(x, y, z, $\Delta T$) to find the phase variations $\Delta\phi$ induced by the variations in the refractive index. In detail, in this embodiment, the unit 199 calculates a 2D map of the phase variation through the formula:

$$\Delta\phi(x, y, \Delta T) = \int_0^L \Delta n(x, y, z, \Delta T)dz,$$

wherein z is the propagation direction of the laser beam within the component under test and L is the length of the component under test along the propagation direction.

The unit 199 converts, step 212, the phase variation $\Delta\phi$(x, y, $\Delta T$) in polar coordinates $\Delta\phi$(r, θ, $\Delta T$).

In detail, the unit 199 decomposes the phase variation by using the Zernike polynomials Z as:

$$\Delta\phi(r, \theta, \Delta T) = \sum_{m,n}[a_{m,n}Z_n^m(r, \theta) + b_{m,n}Z_n^{-m}(r, \theta)],$$

wherein the indexes n, m refer to the radial and, respectively, the angular behaviour of the phase variation.

The Zernike polynomials may also be expressed in terms of a single index $$i = \frac{n(n+2) + m}{2},$$

so that each Zernike polynomial $Z_i$ is associated to a typical optical aberration and the corresponding coefficient represents the weight of said optical aberration in the decomposed wavefront. For example, i=0 represents the piston phase offset, i=1,2 the wavefront tilt, i=3,5 the astigmatism, i=4 the defocus, etc.

Then, step 214, the unit 199 performs a simulation algorithm of the optical propagation of the laser beam in the CBC system 1. The algorithm for optical propagation, per se known in the art, receives as input a model of the CBC system 1, which for example may be previously stored in the unit 199 and provided by a user, and the Zernike polynomials $Z_i$ of the component under test.

The simulation algorithm provides at output data of the optical properties of the recombined beam 75, such as wavefront properties of the recombined beam 75, after propagation in the CBC system 1, in particular after propagation through the component under test.

Based on said output data, the unit 199 determines, step 216, the c.u.t. data, for example the material of the component under test, that optimise the optical properties of the recombined beam 75, for example that guarantee a lowest distortion of the wavefront of the recombined beam 75 and a lowest absorption of the recombined beam 75, depending on the specific application.

In detail, the methods 90, 100, 150 and 200 all contribute to improve the performance of the CBC system 1 and to achieve a value of efficiency close to the theoretical value.

Finally, it is clear that modifications and variations may be made to what has been described and illustrated herein, without thereby departing from the scope of the present invention, as defined in the annexed claims.

For example, the number N of channels may be different from what discussed with reference to FIG. 1; in particular, the CBC system 1 may have up to nineteen channels.

For example, the phase-locking unit 30 may perform a different algorithm, such as a LOCSET algorithm.

For example, the phase-locking unit 30 may be implemented using an FPGA, a multichannel DAC unit or a different hardware. For example, the phase-locking unit 30 may comprise a multichannel DAC unit, be coupled to the CCD camera and configured to extract the peak intensity from the image IMG.

The sample beam 63 may be split directly from the intermediate beams 21A-21D, before being recombined. In this case, the focusing optics would comprise one or more beam splitters arranged between the front coupling portion 45B and the convex lens 55.

In alternative, each opto-mechanical element may also comprise a respective fibre splitter that extracts a small portion of laser power, for example below 0.1%. In this case, each intermediate beam comprises a first portion that propagates through the aperture and is focused by the focusing optics on the target, and a second portion extracted by the fibre splitter that is focused by the focusing optics on the image sensor and/or the intensity sensor.

The focusing optics 17 may have different optical elements with respect to what shown in FIG. 4; for example, the mirror 58 and/or 59 may be absent, so that the optical path 53 is unfolded. Moreover, the lenses 55 and 56 may have different focal lengths and/or different shapes.

According to an embodiment, the present coherent beam recombination system is configured to provide an output recombined beam and may comprise:

a laser source that provides a source beam having a linewidth;

a beam broadener that is coupled to the laser source and is configured to provide a broadened beam having a larger linewidth than the source beam;

a splitter configured to split the broadened beam into a plurality of secondary beams;

a plurality of channels that are coupled to the splitter, each channel being configured to receive a respective secondary beam and to provide a respective intermediate beam, each channel comprising an optical amplifier, a phase modulator, an optical delay line and an opto-mechanical element that provides the respective intermediate beam;

an optical sensor configured to provide a detection signal indicative of an intensity of a received optical beam;

a focusing optics configured to receive the intermediate beams, to provide the output recombined beam from a first portion of each intermediate beam, and to provide a sampled recombined beam to the optical sensor from a second portion of each intermediate beam; and a control unit coupled to the optical sensor and the plurality of channels. The control unit comprises a phase-locking module that is configured to:

provide a plurality of phase control signals, each to the phase modulator of a respective channel, receive the detection signal from the optical sensor, the detection signal being indicative of an intensity of the sampled recombined beam;

calculate a cost function from the detection signal, the cost function being a function of the intensity of the sampled recombined beam;

perform an optimization algorithm of the cost function, the optimization algorithm being configured to maximise the intensity of the sample recombined beam; and provide a plurality of updated phase control signals, based on a result of the optimization algorithm.

Besides, according to an embodiment, the present method may be for controlling a coherent beam recombination system that is configured to provide an output recombined beam and that comprises:

a laser source that provides a source beam having a linewidth;

a beam broadener that is coupled to the laser source and is configured to provide a broadened beam having a larger linewidth than the source beam;

a splitter configured to split the broadened beam into a plurality of secondary beams;

a plurality of channels that are coupled to the splitter, each channel being configured to receive a respective secondary beam and to provide a respective intermediate beam, each channel comprising an optical amplifier, a phase modulator, an optical delay line and an opto-mechanical element that provides the respective intermediate beam;

an optical sensor configured to provide a detection signal indicative of an intensity of a received optical beam;

a focusing optics configured to receive the intermediate beams, to provide the output recombined beam from a first portion of each intermediate beam, and to provide a sampled recombined beam to the optical sensor from a second portion of each intermediate beam; and a control unit coupled to the optical sensor and the plurality of channels. The method may comprise, by a phase-locking module of the control unit:

providing a plurality of phase control signals, each to the phase modulator of a respective channel, receiving the detection signal from the optical sensor, the detection signal being indicative of an intensity of the sampled recombined beam;

calculating a cost function from the detection signal, the cost function being a function of the intensity of the sampled recombined beam;

performing an optimization algorithm of the cost function, the optimization algorithm being configured to maximise the intensity of the sample recombined beam; and providing a plurality of updated phase control signals, based on a result of the optimization algorithm

The invention claimed is:

1. A coherent beam recombination system configured to provide an output recombined beam, the coherent beam recombination system comprising:

a laser source providing a source beam having a linewidth;

a beam broadener coupled to the laser source and configured to provide a broadened beam having a larger linewidth than the source beam;

a splitter configured to split the broadened beam into a plurality of secondary beams;

a plurality of channels coupled to the splitter, each channel being configured to receive a respective secondary beam and to provide a respective intermediate beam, each channel comprising an optical amplifier, a phase modulator, an optical delay line and an opto-mechanical element that provides the respective intermediate beam;

an optical sensor configured to provide a detection signal indicative of an intensity of a received optical beam;

a focusing optics configured to receive the intermediate beams to provide the output recombined beam from a first portion of each intermediate beam, and to provide a sampled recombined beam to the optical sensor from a second portion of each intermediate beam; and a control unit coupled to the optical sensor and the plurality of channels, wherein the control unit comprises a phase-locking module configured to:

provide a plurality of phase control signals, each to the phase modulator of a respective channel;

receive the detection signal from the optical sensor, the detection signal being indicative of an intensity of the sampled recombined beam;

calculate a cost function from the detection signal, the cost function being a function of the intensity of the sampled recombined beam;

perform an optimization algorithm of the cost function, the optimization algorithm being configured to maximize the intensity of the sample recombined beam; and provide a plurality of updated phase control signals, based on a result of the optimization algorithm, wherein the optical delay lines are variable delay lines, each configured to modify the length of the optical path of the respective channel, the control unit further comprising a delay-equalization module coupled to the channels and the optical sensor, the delay-equalization module being configured to:

select a channel to be optimized and a reference channel from the plurality of channels;

determine a coarse estimate of an optical delay between the channel to be optimized and the reference channel, from the detection signal;

provide a delay-control signal to the optical delay line of the channel to be optimized, based on said coarse estimate;

determine a fine estimate of the optical delay between the channel to be optimized and the reference channel, from the detection signal;

update the delay-control signal, based on said fine estimate.

2. The coherent beam recombination system according to claim 1, further comprising an actuator coupled to the optical sensor and configured to cause a displacement of the optical sensor.

3. The coherent beam recombination system according to claim 1, wherein the optimization algorithm is a Stochastic Parallel Gradient Descent algorithm.

4. The coherent beam recombination system according to claim 1, wherein the beam broadener comprises a noise generator providing a broadening signal, and a broadening phase modulator receiving the source beam, providing the broadened beam, and controlled by the broadening signal.

5. The coherent beam recombination system according to claim 1, wherein each opto-mechanical element has an aperture providing the respective intermediate beam and comprises a respective intensity mask configured to block the transmission of a portion of the respective secondary beam.

6. The coherent beam recombination system according to any of the preceding-claims 1, wherein each opto-mechanical element4) has an aperture (46) providing the respective intermediate beam, the apertures (46) being arranged in a tiled-aperture configuration.

7. The coherent beam recombination system according to claim 1, wherein the sampled recombined beam forms an interference pattern having a main lobe, the optical sensor comprising a photodiode coupled to a pinhole having a size smaller than a size of the main lobe.

8. The coherent beam recombination system according to claim 1, wherein the delay-equalization module is coupled to the laser source and is configured to perform a Frequency Modulation Continuous Wave technique to determine the coarse estimate of the optical delay between the channel to be optimized and the reference channel.

9. The coherent beam recombination system according to claim 1, wherein the optical sensor comprises an image sensor configured to provide an image of the sampled recombined beam, wherein the delay equalization module is further configured to:

receive the image of the sampled recombined beam;

measure a fringe visibility of the sampled recombined beam from said image;

update the delay control signal, if the fringe visibility is below a fringe visibility threshold.

10. A method for controlling a coherent beam recombination system configured to provide an output recombined beam, wherein the coherent beam recombination system comprises:

a laser source providing a source beam having a linewidth;

a beam broadener coupled to the laser source and configured to provide a broadened beam having a larger linewidth than the source beam;

a splitter configured to split the broadened beam into a plurality of secondary beams;

a plurality of channels coupled to the splitter, each channel being configured to receive a respective secondary beam and to provide a respective intermediate beam, each channel comprising an optical amplifier, a phase modulator, an optical delay line, and an opto-mechanical element that provides the respective secondary beam;

an optical sensor configured to generate a detection signal indicative of an intensity of a received optical beam;

a focusing optics configured to receive the intermediate beams to provide the output recombined beam from a first portion of each intermediate beam, and to provide a sampled recombined beam to the optical sensor from a second portion of each intermediate beam; and a control unit, the method comprising: by a phase-locking module of the control unit:

providing a plurality of phase control signals, each to the phase modulator of a respective channel;

receiving the detection signal from the optical sensor, the detection signal being indicative of an intensity of the sampled recombined beam;

calculating a cost function from the detection signal, the cost function being a function of the intensity of the sampled recombined beam;

performing an optimization algorithm of the cost function, the optimization algorithm being configured to maximize the intensity of the sample recombined beam; and providing a plurality of updated phase control signals, based on a result of the optimization algorithm, wherein the optical delay lines are variable delay lines, each configured to modify the length of the optical path of the respective channel, the control unit further comprising a delay-equalization module coupled to the channels and the optical sensor, the method further comprising, by the delay-equalization module:

selecting a channel to be optimized and a reference channel from the plurality of channels;

determining a coarse estimate of an optical delay between the channel to be optimized and the reference channel, from the detection signal;

providing a delay-control signal to the optical delay line of the channel to be optimized, based on said coarse estimate;

determining a fine estimate of the optical delay between the channel to be optimized and the reference channel, from the detection signal;

updating the delay-control signal, based on said fine estimate.

11. The method according to claim 10, wherein the coherent beam recombination system further comprises an actuator coupled to the optical sensor, wherein the optical sensor has an active area receiving a spot of the sampled recombined beam, the method further comprising a step of beam steering including controlling, by the actuator, a displacement of the optical sensor, so that the spot of the sampled recombined beam partially falls outside the active area, thereby reducing the intensity of the sampled recombined beam detected by the optical sensor.

12. The method according to claim 10, the method further comprising, by the phase-locking unit:

acquiring an updated detection signal;

calculating an updated cost function;

verifying if the updated cost function satisfies a convergence condition;

if the convergence condition is verified, acquiring a new detection signal and calculating a new updated cost function while the convergence condition is verified; and if the convergence condition is not verified, performing a new iteration of the optimization algorithm and providing a plurality of new updated phase control signals based on a result of the new iteration.

13. The method according claim 10, wherein the optimization algorithm is an iterative Stochastic Parallel Gradient Descent algorithm comprising, by the phase locking module, for each iteration:

generating a plurality of random dephasing signals, one for each channel;

providing a plurality of positive phase control signals, each to a respective phase modulator, each positive phase control signal being the sum between a respective actual phase control signal determined in a previous iteration and the respective random dephasing signal;

acquiring a positive detection signal;

calculating a positive cost function from the positive detection signal;

providing a plurality of negative phase control signals, each to a respective phase modulator, each negative phase control signal being the difference between the respective actual phase control signal and the respective random dephasing signal;

acquiring a negative detection signal;

calculating a negative cost function from the negative detection signal;

wherein the updated phase control signals are each a function of the respective current phase control signal, the respective random dephasing signal and a difference between the positive and the negative cost function.

14. The method according to claim 10, wherein the control unit further comprises a temperature simulation module and the method further comprises, by the temperature simulation module, a step of simulating an optical component of the coherent recombination system including:

receiving first data indicative of a geometry and a material of the optical component;

receiving second data indicative of the properties of the laser beam interacting with the optical component;

determining, from the first and the second data, the phase variations induced by the optical component because of the interaction with the laser beam;

performing an algorithm for simulating the optical propagation within the coherent recombination system, the simulation algorithm receiving as input said phase variations and being configured to output the optical properties of the output recombined beam; and determining optimized first data of the optical component, based on a result of the simulation algorithm.

15. A method for controlling a coherent beam recombination system configured to provide an output recombined beam, wherein the coherent beam recombination system comprises:

a laser source providing a source beam having a linewidth;

a beam broadener coupled to the laser source and configured to provide a broadened beam having a larger linewidth than the source beam;

a splitter configured to split the broadened beam into a plurality of secondary beams;

a plurality of channels coupled to the splitter, each channel being configured to receive a respective secondary beam and to provide a respective intermediate beam, each channel comprising an optical amplifier, a phase modulator, an optical delay line, and an opto-mechanical element that provides the respective secondary beam;

an optical sensor configured to generate a detection signal indicative of an intensity of a received optical beam;

a focusing optics configured to receive the intermediate beams, to provide the output recombined beam from a first portion of each intermediate beam, and to provide a sampled recombined beam to the optical sensor from a second portion of each intermediate beam; and a control unit, the method comprising: by a phase-locking module of the control unit:

providing a plurality of phase control signals, each to the phase modulator of a respective channel, receiving the detection signal from the optical sensor, the detection signal being indicative of an intensity of the sampled recombined beam;

calculating a cost function from the detection signal, the cost function being a function of the intensity of the sampled recombined beam;

performing an optimization algorithm of the cost function, the optimization algorithm being configured to maximize the intensity of the sample recombined beam; and providing a plurality of updated phase control signals, based on a result of the optimization algorithm, wherein the coherent beam recombination system further comprises an actuator coupled to the optical sensor, wherein the optical sensor has an active area receiving a spot of the sampled recombined beam, the method further comprising a step of beam steering including controlling, by the actuator, a displacement of the optical sensor, so that the spot of the sampled recombined beam partially falls outside the active area, thereby reducing the intensity of the sampled recombined beam detected by the optical sensor.

16. A coherent beam recombination system configured to provide an output recombined beam, the coherent beam recombination system comprising:

a laser source providing a source beam having a linewidth;

a beam broadener coupled to the laser source and configured to provide a broadened beam having a larger linewidth than the source beam;

a splitter configured to split the broadened beam into a plurality of secondary beams;

a plurality of channels coupled to the splitter, each channel being configured to receive a respective secondary beam and to provide a respective intermediate beam, each channel comprising an optical amplifier, a phase modulator, an optical delay line and an opto-mechanical element that provides the respective intermediate beam;

an optical sensor configured to provide a detection signal indicative of an intensity of a received optical beam;

a focusing optics configured to receive the intermediate beams, to provide the output recombined beam from a first portion of each intermediate beam, and to provide a sampled recombined beam to the optical sensor from a second portion of each intermediate beam; and a control unit coupled to the optical sensor and the plurality of channels, wherein the control unit comprises a phase-locking module configured to:

provide a plurality of phase control signals, each to the phase modulator of a respective channel, receive the detection signal from the optical sensor, the detection signal being indicative of an intensity of the sampled recombined beam;

calculate a cost function from the detection signal, the cost function being a function of the intensity of the sampled recombined beam;

perform an optimization algorithm of the cost function, the optimization algorithm being configured to maximize the intensity of the sample recombined beam; and provide a plurality of updated phase control signals, based on a result of the optimization algorithm, wherein the coherent beam recombination system further comprises an actuator coupled to the optical sensor and configured to cause a displacement of the optical sensor for steering the output recombined beam.

* * * * *